United States Patent [19]
Pilloff

[11] 3,857,109
[45] Dec. 24, 1974

[54] LONGITUDINALLY-PUMPED TWO-WAVELENGTH LASERS

[75] Inventor: Herschel S. Pilloff, Oxon Hill, Md.

[73] Assignee: The United States of America as represented by the Secretary of the Navy, Washington, D.C.

[22] Filed: Nov. 21, 1973

[21] Appl. No.: 418,016

[52] U.S. Cl. ............................................. 331/94.5
[51] Int. Cl. .............................................. H01s 3/20
[58] Field of Search ................................... 331/94.5

[56] References Cited
UNITED STATES PATENTS

| | | | |
|---|---|---|---|
| 3,753,146 | 8/1973 | Reynolds et al. | 331/94.5 L |
| 3,753,148 | 8/1973 | Billman | 331/94.5 |
| 3,793,541 | 2/1974 | Ashkin et al. | 331/94.5 |

*Primary Examiner*—William L. Sikes

[57] ABSTRACT

A system for longitudinally exciting a tunable laser and operating the tunable laser simultaneously at two wavelengths.

3 Claims, 1 Drawing Figure

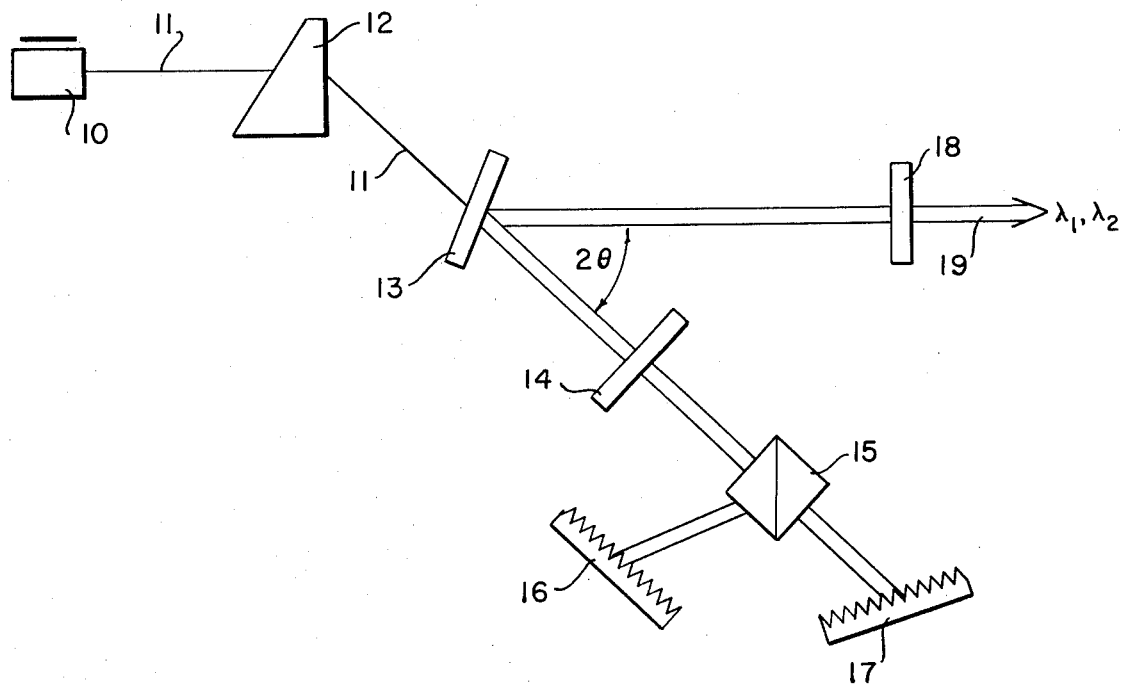

LONGITUDINALLY-PUMPED TWO-WAVELENGTH LASERS

BACKGROUND OF THE INVENTION

This invention relates to laser systems and more particularly to a two wavelength laser system which is longitudinally excited.

Heretofore laser systems have been set forth which produce two different laser wavelengths. Such systems made use of two separate lasers to produce two beams having different wavelengths. In such systems, it is hard to synchronize the two separate beams. Other systems have been used to simultaneously produce two laser beams. Such systems are limited to those laser systems which are either transversely or radially excited and do not permit efficient optical pumping and ease of laser beam control which are characteristic of longitudinally excited systems.

SUMMARY OF THE INVENTION

This invention is directed to a technique for operating a tunable laser simultaneously at two wavelengths where the tunable laser is longitudinally excited by a laser source. Exciting laser light is directed through a deviating prism which permits parallel operation of the output beam from the two wavelength laser to that from the pumping laser. A dichroic mirror having a high transmission at the wavelength of the exciting laser and a very high reflectivity at the longer wavelengths appropriate to the two wavelength laser directs the pumping laser beam onto an active material cell which produces the two wavelength output. The mirror also reflects the output beams in an appropriate optical system. The laser cavity includes a polarizer which forces the polarizations of the two wavelength laser to be mutually orthogonal. The optical cavity is completed by two wavelength selective elements such as separate gratings which are well known in the art.

BRIEF DESCRIPTION OF THE DRAWING

The drawing schematically illustrates an arrangement of the relative parts of the laser system.

DETAILED DESCRIPTION

Now referring to the drawing, there is shown by illustration a schematic arrangement of the relative parts of the laser system. As shown, the system includes a laser 10, such as Argon ion, etc. preferably operable in the $TEM_{oo}$ modes, which directs an exciting output beam 11 onto a deviating prism 12. The deviating prism directs the exciting beam to an angle relative to the output beam of the exciting laser such that the output beam of the two wavelength laser is parallel to that of the pumping laser. The deviated beam is incident onto a dichroic mirror 13 which has a high transmission at the wavelength of the exciting laser with a very high reflectivity at the longer wavelengths appropriate to the two-wavelength laser. The exciting laser beam that passes through the dichroic mirror is incident on the two-wavelength laser cell 14 such as a dye laser cell containing dye laser solution which pumps the active optical material in the cell. The active material cell produces by appropriate electronic transitions a beam of characteristic wavelengths. The output beam of the cell is directed onto a polarizer 15 which forces the polarizations of the two-wavelength laser to be mutually orthogonal. The output cavity of the two-wavelength laser is completed by two well known wavelength selective elements such as optical gratings 16, 17 and a partially reflective output coupler mirror 18 positioned at an angle 20 relative to the dichroic mirror 13. The two selected laser wavelengths 19 pass through output mirror 18 as is well known in the art.

In operation, the exciting laser produces electronic transitions in the visible whose output beam 11 is directed through the deviating prism and the dichroic mirror onto the cell 14 to excite the active material therein to produce an output spectrum. The wavelength selector gratings are positioned at a particular angle with respect to the spectrum output of the active optical material cell. As such, each grating will reflect a beam of a particular wavelength back through the polarizer and the cell to the back side of the dichroic mirror. The dichroic mirror reflects the two-wavelengths to the partically reflective output coupler mirror. The output mirror reflects the pair of beams back and forth within the cavity between the coupler and the gratings. while partially transmitting a portion of each beam as is well known in the art. By independently rotating the two gratings, any two laser transitions within the output spectrum can be selected. Because the polarizer in the laser cavity forces the polarizations of the two-wavelengths laser to be mutually orthogonal, it may be advantageous to vary the polarization of the laser pumping source with respect to the polarization of the two-wavelengths.

It can be seen from the above, that the present two-wavelength laser system permits one to operate a tunable laser simultaneously at two selected wavelengths in a manner such that the tunable laser can be longitudinally excited by a laser pumping source.

It will be obvious to one skilled in the art that other laser types may be used for exciting the two-wavelength cell and that focusing lenses may be used by which the light is focused onto the laser cell.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A laser system with simultaneous two wavelength operation; which comprises,
    a laser for producing an exciting laser beam,
    an optical beam deviating prism in optical alignment with said laser for deviating the optical path of said exciting laser beam,
    a first mirror in optical alignment with said deviating prism for transmitting the incident deviated exciting laser beam toward an active optical material cell,
    said first mirror having high transmission at the wavelength of the exciting laser beam and very high reflectivity at the two wavelength operation of said system,
    an active optical material cell so positioned to receive the exciting laser beam transmitted by said first mirror for excitation thereof,
    a polarizer adjacent said cell in optical alignment therewith, first and second wavelength selective elements optically positioned to receive mutually polarized light and reflecting a desired beam therefrom, and an output coupler partially reflective mirror in optical alignment with radiation reflected by said first mirror.

2. A laser system as claimed in claim 1; wherein, said first mirror is a dichroic type.

3. A laser system as claimed in claim 2; wherein, said first and second wavelength selective elements are optical gratings.

* * * * *